(12) United States Patent
Guazzelli (10) Patent No.: US 8,059,010 B2
(45) Date of Patent: Nov. 15, 2011

(54) MARINE TELEMETRY AND TWO WAY COMMUNICATION SYSTEM

(75) Inventor: Octavio Guazzelli, Santa Catarina (BR)

(73) Assignee: SailorMade Tecnologia Ltd. (BR)

( * ) Notice: Subject to any disclaimer, the term of this patent is extended or adjusted under 35 U.S.C. 154(b) by 923 days.

(21) Appl. No.: 12/043,915

(22) Filed: Mar. 6, 2008

(65) Prior Publication Data
US 2008/0246627 A1  Oct. 9, 2008

Related U.S. Application Data (60) Provisional application No. 60/893,222, filed on Mar. 6, 2007.

(51) Int. Cl.
*H04Q 9/00* (2006.01)
(52) U.S. Cl. .................................. 340/870.07
(58) Field of Classification Search ............. 340/870.07, 340/870.01–870.03, 870.09
See application file for complete search history.

(56) References Cited

U.S. PATENT DOCUMENTS

| | | | |
|---|---|---|---|
| 4,092,629 A | 5/1978 | Siem et al. | |
| 4,464,739 A | 8/1984 | Moorcroft | |
| 4,835,744 A | 5/1989 | Todd et al. | |
| 4,967,400 A | 10/1990 | Woods | |
| 5,047,990 A | 9/1991 | Gafos et al. | |
| 5,597,335 A | 1/1997 | Woodland | |
| 5,631,874 A | 5/1997 | Mastin et al. | |
| 6,469,641 B1 | 10/2002 | Lash et al. | |
| 6,813,218 B1 * | 11/2004 | Antonelli et al. | 367/3 |
| 6,816,088 B1 * | 11/2004 | Knoska et al. | 340/984 |
| 6,933,884 B2 | 8/2005 | Martin et al. | |
| 6,940,421 B2 | 9/2005 | Chamberlain et al. | |
| 6,980,124 B2 * | 12/2005 | Kong et al. | 340/870.11 |
| 7,047,114 B1 | 5/2006 | Rogers | |
| 7,099,755 B2 | 8/2006 | Mueller et al. | |
| 7,343,261 B1 * | 3/2008 | Kell | 702/127 |
| 7,612,686 B1 * | 11/2009 | Bustamante et al. | 340/850 |
| 2003/0176971 A1 | 9/2003 | Daniels et al. | |
| 2004/0059477 A1 | 3/2004 | Kish | |

(Continued)

FOREIGN PATENT DOCUMENTS

JP  02003212187  *  7/2003

(Continued)

OTHER PUBLICATIONS

Search Report & Written Opinion PCT/2008/056097, mailing date Jun. 10, 2008.

(Continued)

*Primary Examiner* — Albert W Paladini
(74) *Attorney, Agent, or Firm* — Knobbe, Martens, Olson & Bear, LLP (57) ABSTRACT

A marine telemetry system can comprise a central processing unit (CPU) with data processing and storage capacity. The system can further comprise sensors and/or other electronic accessories such as radars, fish finders, weather stations, etc. The system can be operated by a touch-screen display. The system can perform the measuring, indication, recording and/ or integration of values from the many quantities that are possible to measure by such sensors and other electronic accessories comprising part of the system. The system can have the capacity of transmitting, receiving and communicating at a distance through broadband internet accessed via various access points. In this way the user can also gain access to the World Wide Web and use its many references and information to enhance the onboard boating experience.

13 Claims, 3 Drawing Sheets

U.S. PATENT DOCUMENTS

| | | |
|---|---|---|
| 2004/0111195 A1 | 6/2004 | Vries et al. |
| 2005/0096803 A1 | 5/2005 | Knoska et al. |
| 2005/0156735 A1 | 7/2005 | Humphries et al. |
| 2005/0209746 A1 | 9/2005 | Kish et al. |
| 2006/0089754 A1 | 4/2006 | Mortenson |
| 2006/0176193 A1 | 8/2006 | Wraight |
| 2007/0040672 A1 | 2/2007 | Chinigo |

FOREIGN PATENT DOCUMENTS

| | | | |
|---|---|---|---|
| NO | EP199622 | * | 5/2001 |
| WO | WO 02/077937 A | | 10/2002 |
| WO | WO 2007/020523 A | | 2/2007 |

OTHER PUBLICATIONS

Cassidy, F., A New Launch for Onboard Network, Cruising World, Mar. 2006, p. 44-46, 48-53.

Murphy, T. Connecting the Dots, Crusing World, Mar. 2006, p. 47, 49, 51, 53.

* cited by examiner

MARINE TELEMETRY AND TWO WAY COMMUNICATION SYSTEM

CROSS-REFERENCE TO RELATED APPLICATIONS

This application claims the benefit of U.S. Provisional Application No. 60/893,222 filed Mar. 6, 2007, the entire contents of which are hereby incorporated by reference and should be considered a part of this specification.

BACKGROUND OF THE INVENTION

1. Field of the Invention

The present invention generally relates to telemetry systems and more particularly, to marine telemetry systems used onboard boats when moored or at sea. The disclosed marine telemetry system is also related to the monitoring of key information about a boat, and for voice and data communication to and from a boat over a connection to the internet.

2. Description of the Related Art

The boating industry enjoys a wide array of boat users and encompasses an essential part of other industries such as the commercial fishing industry and the cruise line industry. Boating is also regularly enjoyed by personal users for both leisure and work activities. As a result of these differing economic and leisure uses, a large of variety boats of all sizes and configurations are produced annually.

In every case, the safe, proper, productive and enjoyable use of boats includes the gathering and processing of information. This information may be as simple as checking the weather reports for that day in the newspaper or on the radio. It may also include important information about the boat itself, such as the functioning of engines, pumps and electrical circuits. The information may be more complex and can include, for example, navigational aids, fish finders, global positioning system receivers and so on.

Often this information is not readily available. Even when the information is available it may not be easily gathered for consultation because the user has to obtain the information from differing sources in varied locations in the boat or otherwise. Lastly this information can be difficult to apply and review properly, especially if there is no record of historical or real time data.

Telemetry is the science and technology involved in the automatic measurement and transmission of data by wire, radio or other means from remote sources to receiving stations for recording and analysis. Telemetry has been used in various applications to gather and analyze data such as in spacecraft, and racecars.

SUMMARY OF THE INVENTION

As discussed above, written communication and data transfer of information can be highly valuable in some conditions and situations, even in light of the use of obligatory onboard radio equipment. Therefore, there is a need to maintain boats in contact with a more constant, stable and productive environment through a system capable of communication, display and storage of data from a multitude of sources, including the use of telemetry.

A unique marine telemetry system can have data processing and storage capacity and can function as a central processing unit (CPU). The system can be connected through special cables with sensors and/or other electronic accessories (radars, fish finders, weather stations, etc) and can be operated by a touch-screen display, using simple buttons. This capability can allow the measuring, indication, recording or integration of the values of the many quantities that are possible to measure by existing or future onboard devices. The system can have the capacity of transmitting, receiving and communicating at a distance through broadband internet that can be accessed due to connections to amplifiers and antennas that can provide satellite or cell phone access to the Internet. In this way the user can also gain access to the World Wide Web and use its many references and information to enhance the onboard boating experience.

The system can use a CPU to gather and record information from different sources. These sources can include sensors in the engine, in the fuel tanks, on the batteries, etc. These sources can also include GPS units, radars, fish finders, etc. The system can also retrieve information through the internet. This can be possible through wireless communication established through cell phone or satellite services. The system can gather all of this information and make it available to the boat user using a simple electronic interface.

Another important feature of some embodiments of the system is that the information gathered and stored by the CPU from the different sources, such as sensors, can also be relayed to another CPU, computer or server over the internet. This constant data transfer can be independent of the boat user's activities and can allow other users to constantly monitor key information about the boat that is being tracked and recorded by the CPU from the different sources.

According to one embodiment, a marine telemetry and two-way communication system can comprise a central processing unit, at least one sensor module, that can be configured to measure at least one parameter of the boat and to communicate the at least one parameter to the central processing unit, and an interface located on the boat. The interface can communicate with the central processing unit and can be configured to receive information from and to input information to the central processing unit. One embodiment can also comprise a two-way communications unit associated with the boat to communicate to and from the CPU and from the CPU out. The system can be configured to communicate information related to the at least one measured parameter to the interface and to a remote computer, where the information can be saved by the remote computer and can be accessible from a website, the remote computer can be capable of displaying the information at substantially real-time to the website.

In some embodiments a marine telemetry and two-way communication system can comprise a central processing unit, a group of sensor modules and an interface. The group of sensor modules can be configured to each measure at least one parameter of the boat and communicate the at least one parameter to the central processing unit. The group of sensor modules can comprise a position sensor, an orientation sensor and an operational sensor. The system can be configured to communicate information related to the measured parameters to the interface in some embodiments.

Other systems and methods within the spirit and scope of the invention can be used to receive and analyze information from other sources and sensors, as well as convey additional information to a user to enhance and simplify the gathering, sending and analysis of information either onboard the boat or at some other location. Additionally, the principles discussed herein can also be applied to other uses besides marine and boat use.

BRIEF DESCRIPTION OF THE DRAWINGS

The features and advantages of this invention, and the manner of attaining them, will become apparent by reference to the following description of preferred embodiments of the invention taken in conjunction with the accompanying drawings, wherein.

DETAILED DESCRIPTION OF THE PREFERRED EMBODIMENT

Data and information onboard boats can be of an enormous quantity and can be beneficially used by its crew and marine authorities to improve satisfaction and safety of usage. A marine telemetry and two-way communication system can process, store and/or split this data for more efficient use. The system can permit that such data is shared with land-based centers through real time communication via cellular phone and/or satellite networks. The dissemination of knowledge and information by the disclosed system can help boat users achieve safer and more productive operational cycles, be them of leisure or professional source.

Figure 1:
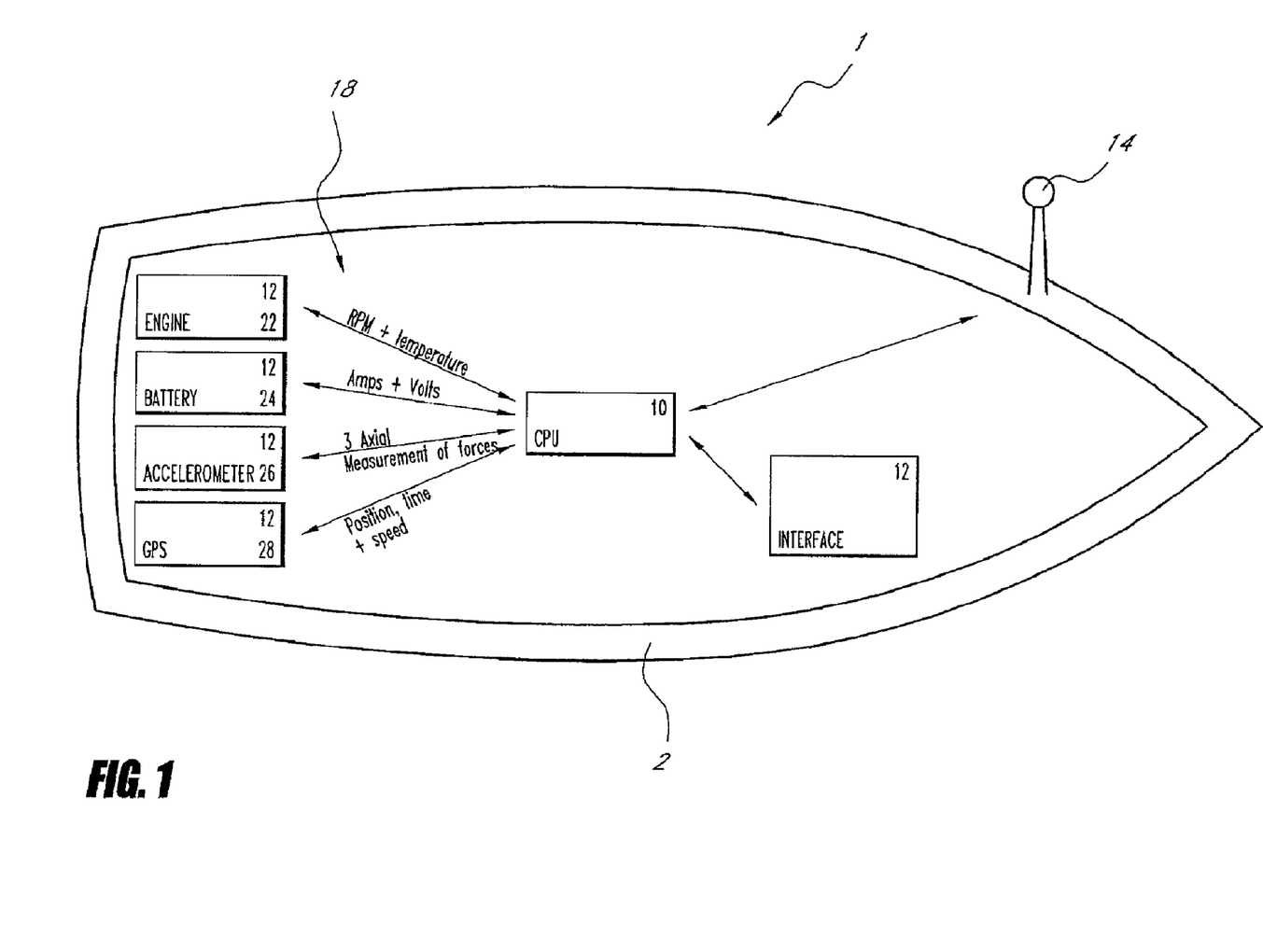
FIG. 1 is an overview of the system employed on a boat demonstrating the two-way communication between the boat's CPU and the sensors/other electronic accessories.

FIG. 1 illustrates an overview of the system according to one embodiment. A boat 2 can be outfitted with a marine telemetry and two-way communication system 1. The system 1 can comprise a central processing unit (CPU) 10, and at least one module 12. The CPU 10 can act as a central hub that can collect and store data from the at least one module 12. As such, the CPU 10 can act as a data collector and an information storage device.

The CPU 10 can also act as a two-way communication system. In some embodiments, the CPU 10 can receive and transmit information to the at least one module 12. In other embodiments, with more than one module 12, the CPU 10 can receive and transmit information not only with an individual module but it can facilitate the exchange of information between modules. In certain embodiments the CPU 10 can communicate with any or all of the other electronic systems operating on the boat.

The at least one module 12 can be connected to the CPU 10 by wires or it can communicate wirelessly. According to one embodiment, the system 1 can comprise a CPU 10, at least one module 12, and at least one cable 18. The module 12 can be attached to the CPU 10, via the at least one cable 18. Cable 18 can comprise connectors employed in the maritime, communication and/or computer industries. For example, the cable 18 can have RJ45, RS232, 1394 or USB type connectors, or other types of connectors that are available on the market. According to another embodiment, the at least one module 12 can be connected to the CPU 10 via cable 18, wherein cable 18 can have proprietary connectors or connectors that are not as readily available on the market.

The system 1 according to certain embodiments can comprise a transfer port. The transfer port can comprise, but is not limited to a connector similar to the connector types described above and can be configured for the quick transfer or downloading of information from the CPU 10 to some other source. The other source can comprise, for example, a floppy disk, a hard drive, a flash memory data storage device (such as a USB flash drive), or a memory card.

As shown in FIG. 1, the system 1, of some embodiments, can have the capability to integrate a number of different modules 12. Each module 12 can have a specific role and can be incorporated into the operational routine of the vessel through the CPU 10. In some embodiments, the CPU 10 can be expandable to increase, for example, processing power, memory, and/or the number of connecting ports. The CPU 10 of some embodiments can provide additional connecting ports and connecting ports alternatives so that the system can be expanded to increase the number of modules 12 integrated therein at a later time (i.e. sometime after installation).

The at least one module 12 can comprise any one of a wide variety of different modules 12 designed for different or similar purposes. The following description of certain modules 12 is nonexclusive. A system 1 can comprise at least one of the following modules 12, all of the following modules 12 or it could comprise other modules 12 not described herein or a combination of modules 12 described herein and not described herein.

In some embodiments, the at least one module 12 can comprise at least one sensor or transducer. The module 12 can alternatively comprise multiple sensors and/or transducers. The sensor or transducer may comprise a simple sensor, for example, one that measures voltage or a change in voltage. The sensor or transducer may comprise a more complex sensor. The module 12 may further comprise a circuit. The circuit can have the ability to generate a calculated value, to filter out noise or to perform other functions. The sensor or transducer, of certain embodiments, can be used to calculate a value such as temperature, pressure, voltage, etc. The calculations can be performed by the module 12 or by the CPU 10. The module 12 can comprise a memory. In some embodiments, the module 12 can comprise the ability to communicate information to the CPU 10 and/or to other modules 12. In certain embodiments, the module 12 can comprise a dedicated CPU. The dedicated CPU can retrieve, measure, store and/or process information. In some embodiments, the module 12 can comprise a display.

In some embodiments, the at least one module 12 can comprise an engine module 22. An engine module 22 can comprise a sensor connected to the engine of the boat. The engine module 22 can alternatively comprise multiple sensors connected to the engine. The engine module 22 can collect or measure data related to, for example, temperatures of water and/or oil, oil pressure and engine revolutions per minute (RPM). In some embodiments, the engine module 22 can alarm a user to dangerous circumstances such as dangerously high RPM readings. In alternative embodiments the CPU 10 can provide the necessary alarms related to this module and others. In some embodiments the engine module 22 can collect or measure data related to maintenance of the engine, for example, total operating time and time since last service. In some embodiments, the CPU 10 can convey information related to the maintenance of the engine and/or the boat that can be related to or independent of the information from the engine module 22, or other modules described herein.

Still referring to FIG. 1, in certain embodiments the at least one module 12 can comprise a battery module 24. A battery module 24 can comprise a sensor connected to the battery of the boat. The battery module 24 can comprise multiple sensors connected to the battery. The battery module 24 can collect or measure data related to, for example, current, in the form of amperes and power in the form of voltage.

In some embodiments, the at least one module 12 can comprise at least one accelerometer 26. In certain embodiments, the at least one accelerometer 26 can comprise a three-axis accelerometer. The accelerometer 26 can, for example, constantly measure, for the CPU to record, impacts suffered by the boat. Such measurement can include the static and dynamic behavior of the boat. This information can be useful many purposes. Some of these purposes include determining the boat's equilibrium, establishing a likely comfort level of the boat occupants, and the relative safety/dangers of current conditions on the water. This information can also be helpful in accident reconstruction and for maintenance purposes, i.e. to verify structural integrity of components after certain thresholds of force are recorded.

In some embodiments, the at least one module 12 can comprise a global positioning system (GPS) receiver 28. The GPS receiver 28 can determine its location (i.e. latitude and longitude), speed, direction, true course and time. The GPS receiver 28 could use a standard GPS sensor or other suitable positioning systems could be used, this could include but is not limited to a cellular positioning system.

Some additional modules 12 according to certain embodiments can include fuel tank modules, and water tank modules. These modules can measure, for example, volume of fuel or water present within the tank and pressure within the tank.

Another example of a module 12 of some embodiments can be a weather module. The weather module can comprise a weather station that can measure information related to weather. These measurements can include: ambient temperature, relative humidity, barometric pressure, wind speed and/or wind direction.

In addition to the disclosed modules 12, other suitable modules 12 for similar or different purposes then those discussed herein could be utilized. The other modules 12 could for example, measure particular parameters concerning the boat itself, or parameters related to certain of the boat's components. Relationships between the different modules 12, utilizing, for example, position sensors, could also be measured. Additionally, the at least one module 12 could be a control module, designed to control a particular component or system of the boat.

Moving now to other parts of the system 1, the CPU 10 can also convey or display information to a boat user. The system 1 can comprise an interface 16. The interface 16 can provide the operational interface between the user and the CPU 10. As such, the interface 16 can provide data concerning the internal system of the CPU 10, and/or concerning information related to the information received from the at least one module 12. The interface 16 can provide raw data or processed data. This information can be segmented depending on the module from which it comes, or in one embodiment, the information can be combined. In either case the information can be presented in a user friendly manner. The information can also be divided into categories such as, for example, engine management, boat maintenance, course, log, etc. The user can also access the internet through the interface 16, as will be described in more detail below.

The interface 16 can comprise a monitor. The interface 16 can further comprise a data entry source. The data entry source can comprise, for example, buttons, a keyboard, a keypad and/or voice recognition. The interface 16 can comprise a touch-screen monitor. The interface 16 can be connected to the CPU 10. The interface 16 can display the raw data sent to the CPU 10 or other information related thereto. For example, the interface 16 can display alarms or levels to a user. The alarms can include: temperatures, levels, quantities, voltage, speeds, leaning angles and so on. The interface 16 can comprise at least one gage. The interface 16 of certain embodiments can show an electronic depiction of a gage. The interface 16 can be mounted on the boat's dashboard or on a special support for easy access. The touch-screen monitor can be, for example, 12 inches, 15 inches or 18 inches along the diagonal.

The system 1 can also comprise a loudspeaker (not shown). The speaker can convey information to a user. The speaker according to certain embodiments can sound alarms when necessary. In some embodiments, the speaker can convey other information to the user.

The system 1 of certain embodiments can conform to the NMEA 0183 interface standard as related to electrical signal requirements, data transmission protocol and time, and specific sentence formats for a 4800-baud serial data bus. The system 1 of certain other embodiments can conform to the NMEA 2000® interface standard. The use of NMEA standards can allow the system 1 to communicate with the other electrical systems within the boat. This can facilitate control of these electrical systems by the system 1. So, for example, a user can command the operation and performance of additional accessories present onboard the vessel such as air-conditioning, refrigerator, security cameras, bilge pump and navigation lights that also conform to the corresponding standard. As mentioned above, in certain embodiments the system can utilize a module 12 that is a control module to perform these same tasks.

The system 1 of certain embodiments can be powered via the boat battery. The system 1 can alternatively be powered with batteries dedicated to the system 1, and/or with solar panels and/or wind generators or other sources of power.

The system 1 of certain embodiments can comprise a communications unit 14. In some embodiments, the communications unit 14 can comprise an air card for data transmission, a signal amplifier, an antenna, a satellite telephone, satellite communication device, Wi-Fi and/or WiMAX. The communications unit can be configured to provide communication wherever the boat is, whether it is close to the shore or far in the middle of the ocean. The communications unit 14 can facilitate the transfer of information from the CPU 10 to other CPUs, computers or servers. This can be accomplished over an internet connection. Information can be transferred via an internet portal that can allow the CPU 10 to access the portal directly. In one preferred embodiment, the CPU 10 can transfer information directly to the internet portal independent of the boat user's actions. The CPU 10 can provide for constant data transfer. The constant flow of data can also enable the constant monitoring of information concerning the boat as recorded or measured by the at least one module 12 and transferred to the CPU 10.

The communications unit 14 can also allow the boat user to browse the internet utilizing the cell phone, satellite, Wi-Fi or WiMAX connections. With web access other uses are possible including, Voice over Internet Protocol (VoIP) communication.

Figure 2:
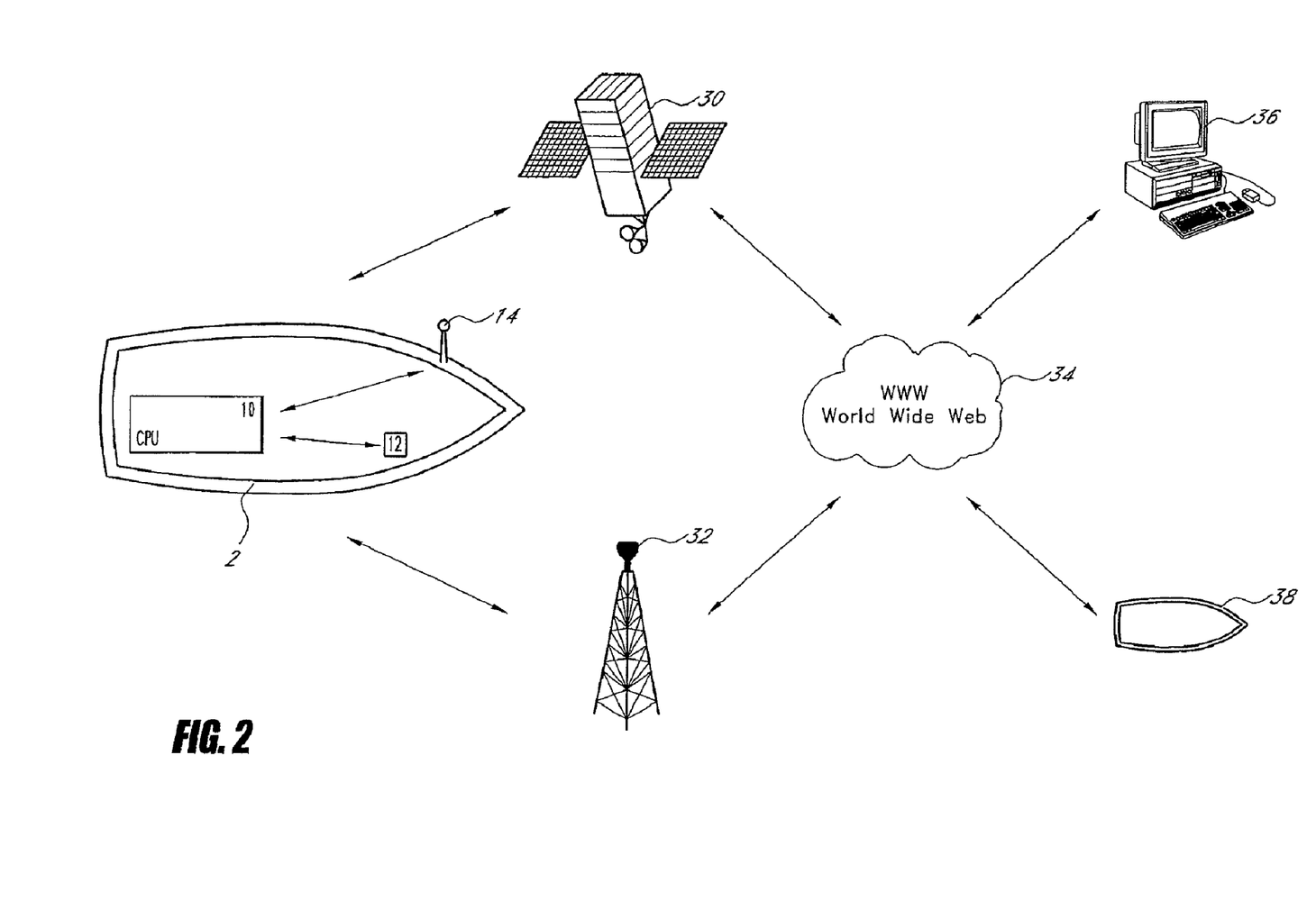
FIG. 2 illustrates a communications overview of the system, showing how voice and data communications can be sent and received from one boat to another boat or to another computer through access to the internet.

Turning now to FIG. 2, the two-way transfer of data and voice information of certain embodiments can be explained. As illustrated, boats 2 (from 1 to N number of boats) equipped with the system 1 can have a CPU 10 attached to a communications unit 14 that either via satellite 30 or cell tower 32 can establish a broadband connection to the World Wide Web (WWW) 34. This allows the boats 2, equipped with the system 1, to surf the web, stream media, send and receive data and/or voice to or from other boats 38 (from 1 to N number of other boats also equipped with the System) or from computers 36 (from 1 to N number of devices) that are also connected to the WWW 34 through their own proprietary or not systems. Computers 36 is a broad term that can include but is not limited to server, web server, desktop computers, laptop computers, personal digital assistants (PDAs), mobile phones, MP3 players, and other handheld portable computing devices.

FIG. 2 shows both satellite 30 and cell phone tower 32 for demonstrative purposes. In a preferred embodiment, the system 1 can utilize either a satellite based system or a cell tower based system. In another embodiment, the system 1 can comprise the use of WiFi or WiMAX up to a certain distance off shore and then the use of cell phone or satellite communication outside that range. The distance off shore can be, for example, up to 30 miles off shore.

Such a system 1 can have many benefits. For example, the information stored by the system 1 can be adjustable to be chosen, for example, by the owner of the boat based on the owner's needs. The system 1 can record, in parallel, different data that can have both an immediate use (where to go, what can be expected, alarms) and a statistical employment (hours, cycles, times). The system 1 can be accessed from the interface 16 of boat 2 or via the Internet from boats 38 or computer 36. The information from system 1 can be accessed on either a real-time or historical basis, where real-time can include substantially real-time or real-time with a small lag time. This can permit certain master control and correction as deemed necessary by a boat owner or operator, independent of his/her location (i.e. whether on the boat 2 or not). The amount of access and control given to persons not on the boat is something that can also be controlled and adjusted in certain embodiments. Such control may include the control of the alarms and operational limits of each of the components.

The system of one embodiment allows for the constant monitoring of boat performance and other key information concerning the operation of the boat. The system can comprise an electronic log book that records the specifics about where the boat has been and when it was there. The system 1 of one embodiment with a GPS receiver 28 can transmit information concerning the location of the boat over the internet so that the boat's location can be tracked. The system 1 of another embodiment can allow instantaneous knowledge of the technical parts of the boat, such as the engine, and can allow for others outside of the boat, such as technicians, to be fully aware of and to follow the live operation of the boat.

According to some embodiments, the entire operational life of a boat can be thoroughly known, better employed and more efficiently used through a system 1. In certain embodiments the system 1 can provide a permanent reference much like the odometer of an automobile while providing much more information about the life and use of the boat.

The maritime telemetry and two-way communication system 1 of some embodiments can provide 1) reading and storage of specified performances of onboard gadgets and instruments and 2) voice and/or data communication capabilities using the established World Wide Web. The system can provide the boat owners and operators with the opportunity to maintain a constant control of the operational cycle of the vessel, using the system's components. These components can operate synchronously as a computer network when connected with cables that have appropriate pin connectors that gather information from sensors on the boat. The core of the system can be the Central Processing Unit (CPU) that through the physical connection with cables can receive and collect data and information from the sensors and from other electronic devices on the boat. Using installed circuits and memory, the CPU can process the information and can display, by users request, the gathered data on a monitor that can be installed in the boat's dashboard that can also be connected in the same network. Through this same screen, the CPU can be instructed to access the Internet using the transmitting module that can be composed of a card with cellular phone transmission or satellite communication capabilities. These cards are available in the market from different suppliers and permit different speeds and ranges of transmission. The signal can pass through special and dedicated antennas and amplifiers until it reaches the coverage range of transmission centers or satellites transponders. The reverse path can be employed simultaneously from land-based computers, linked to the Internet by their own customary (DSL, dialed-up, etc) ways. With the use of dedicated passwords, to request specific onboard information or to log into the system through the CPU, the user of the system can command the operation and performance of additional accessories present onboard the vessels such as air-conditioning, refrigerator, security cameras, bilge pump and navigation lights.

Additional features that can be a part of certain embodiments of the system 1 can relate to the transforming of the raw, filtered, amplified or otherwise data from the at least one module 12 into information that can be readily accessed and utilized by a user. In a simple form, this feature can, for example, include converting a voltage reading from the at least one module 12 into a temperature that can be displayed on the interface 16.

In another embodiment, the feature can comprise obtaining the accelerations on the three spatial axis's of one or more accelerometer 26. This information can be transformed to provide a user with, for example, dynamic motion of the boat; and dynamic strengths, forces, tensions and displacements experienced on the whole boat structure. This information can in turn be used to show a user the real-time stability of the boat, with for example, a real-time visual of the position of the boat displayed on the interface 16.

The system 1 can then generate additional content related to this information to be displayed along side or as an option to see after selection. In one embodiment, the additional content can comprise a physiological zone of operation that that particular boat at the particular sea/wind/wave conditions the boat is currently experiencing, and is giving to her occupants at that moment. This information can also be combined with suggestions on how to operate the boat in a better and/or safer way that can also lead to a more enjoyable experience for the boat occupants.

In another embodiment, information related to the displayed information can include, for example, how to safely operate the boat under current weather conditions or what precautions should be undertaken under current or forecasted weather conditions. Or the information could be related, for example, to current running conditions of the boat, and instruct that at the current speed and distance traveled and in light of the current course and impacts experienced by the boat the user will want to slow to X knots before proceeding to turn to the starboard to stay on the originally plotted course.

Figure 3:
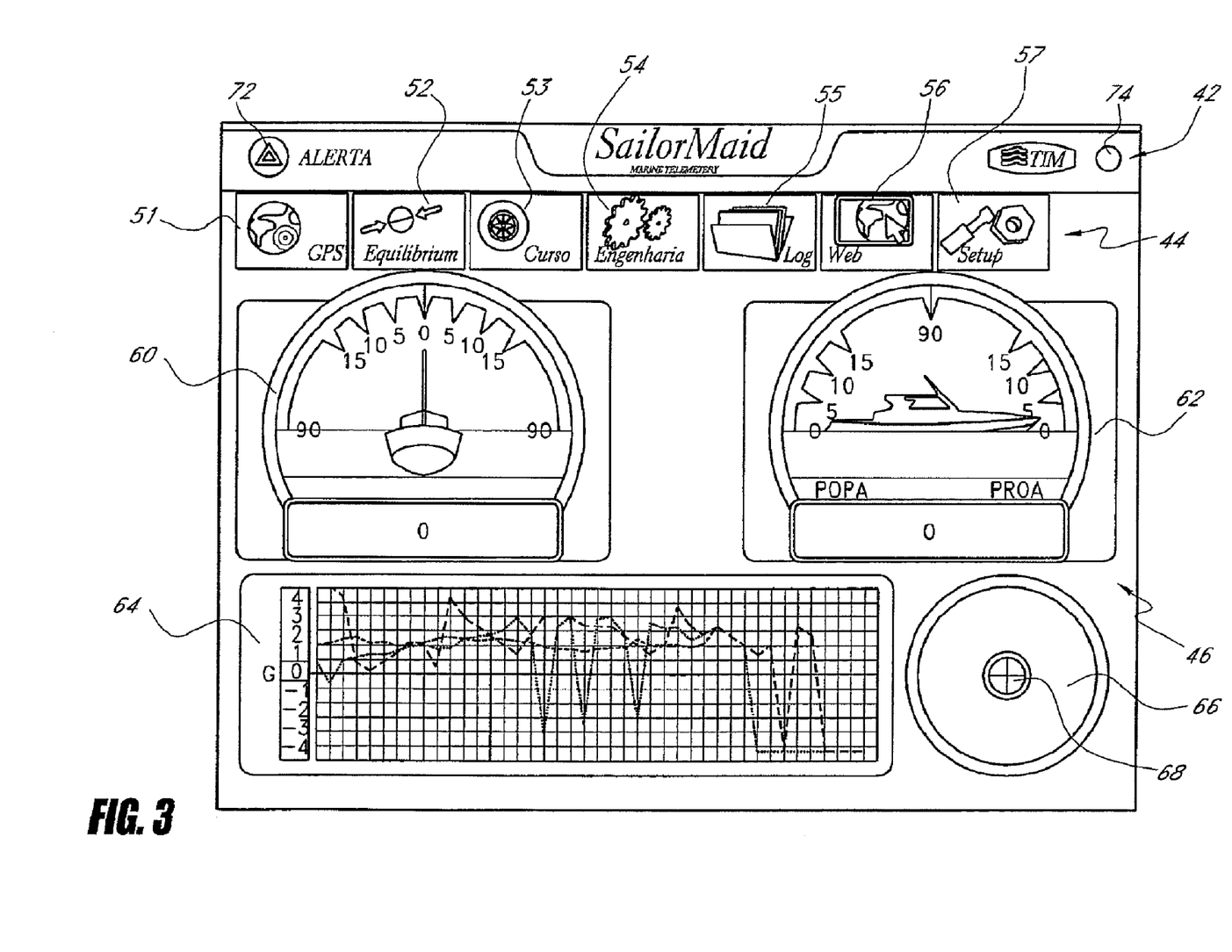
FIG. 3 is a screen shot from the interface of one embodiment displaying information related to the stability of the boat.

Turning now to FIG. 3 a screenshot 40 from an interface 16 according to one embodiment is illustrated. In the illustrated embodiment, the interface 16 can comprise a touch-screen to allow interactive manipulation of the system functions. In a preferred embodiment, a user, utilizing the touch-screen can reach any piece of data within the system in a maximum of three levels on the touch-screen. In other arrangements, a lesser or greater number of levels may be provided. The interface 16 of certain embodiments can always be on and can be simplified to the point where a manual is not required to operate the interface 16.

As illustrated, the interface 16 can display a title bar 42 and a menu bar 44. The interface 16 can also have a main display area 46. The menu bar 44 can display a list of options 51-57. When a user selects on option from the menu bar 44 the interface can display information in the main display area 46, derived from the at least one module 12 and/or information related to that option. The menu bar 44 can display options such as: GPS 51, equilibrium or stability 52, course or navigation 53, engine 54, log or log book 55, web or WWW 56, setup 57 and other suitable options. The options shown on the menu bar 44 of the illustrated embodiment will now be discussed.

By selecting the GPS 51 option a user can be displayed a GPS representation of the boat's current location. This information can be based on, for example, information gathered by the GPS receiver 28. In some embodiments, the GPS 51 option can allow the user to browse or modify the representation by the use of zooming, changing the center, viewing maps and viewing course labels. In some embodiments, the GPS 51 option can allow the user to quickly measure distances between points. Some embodiments can also allow the user to view and/or overlay maps from different sources such as satellite photos and nautical charts. Additional embodiments can also retrieve information from the internet to supplement the information provided or derived from the at least one module 12. The GPS 51 option can also allow the boat to be tracked in real time via the internet by other users either on the boat or not on the boat, according to certain embodiments.

As illustrated, by selecting the Equilibrium 52 option, the interface 16 can display information similar to the information displayed in the main display area 46 of FIG. 3. This option 52 can utilize data from the at least one accelerometer 26. For example, analog voltage outputs can be calibrated and transformed to calculated g forces, displayed at 64. The display can then show the dynamic motion and forces experienced by the boat. FIG. 3 shows that this can be accomplished by displaying the roll/pitch angles of a virtual boat 60, 62 based on the forces currently being experienced by the boat.

FIG. 3 also shows the physiological comfort zones of operation 66 represented by the position of a moving ball 68. The moving ball 68 can indicate the stability of the boat and the distance from the center can represent how far the boat is from the optimum, i.e. how far from the physiological comfort zone of operation. The system 1 of some embodiments can provide additional information to help the boat operator return the boat to the zone of physiological comfort. This information can be in the form of a system of prerecorded text messages that advise on the screen what changes are necessary to return or fix a stability/comfort zone problem. In one embodiment, the system 1 can make adjustments to the control of the boat to increase the boat's stability. This can beneficially increase the safety of the occupants on the boat and reduce the risk of loss to the boat itself.

This tool can be a valuable way of giving insurance companies increased piece of mind by lowering their risk. This tool can also be useful for financial institutions to manage risk as well, where for example the boat may be collateral for a loan. This information may be recorded so that the insurance company and the financial company can know exactly how the boat is/has been operated. These institutions can also use this information to create customer profiles for boating risk management and for stronger customer resource management.

Returning now to FIG. 3, the course or navigation 53 option can include GPS data, latitude, longitude, speed, true course, date and/or time. In some embodiments, the course 53 option can also display a pictorial view of the course. This capability can be integrated with live internet tracking via computer 36 as discussed previously. Course 53 can display the aforementioned data and/or other data related thereto and/or related to the course the boat is taking.

The engine 54 option can display data from or derived from the engine module 22 or other information related to or from the boat's engine. In some embodiments, this option can also display information related to engine control and the systems related to powering the engine. This can include but is not limited to the battery, fuel tanks, water tanks and the boat's electrical systems. The engine option 54 can be displayed either in analog or digital format. Certain embodiments can allow the user to control whether the display is analog or digital. The engine 54 option of some embodiments can also display alarms related to the at least one module 12 being monitored for when a dangerous condition is encountered. When an alarm is triggered the system of one embodiment can notify a user of corrections to return to a safe condition. These notices can be in the form of text messages, audio or other suitable methods. In one embodiment, the system 1 can make adjustments to the control of the engine when dangerous conditions arise. In another embodiment, the system 1 can control certain engine parameters when dangerous conditions arise. These parameters can include, for example, alarm levels and fluid flows into the engine.

The log or log book option 55, of one embodiment, can allow, for example, a user to see and analyze all of the data logged by the system 1 and the current and historical alarm status.

The web or WWW 56 option, of one embodiment, can allow full access to the internet. In another embodiment, the web option can allow access to certain features of the internet or to certain web pages. These features can include: weather, e-mail services, SKYPE, maps, search engines and other types of web solutions. In some embodiments, the web 56 option can also allow access to additional information or updates related to the system 1 itself. The web 56 option of certain embodiments can use GPS data at access weather data from the closest city or buoy available. In some embodiments, the web 56 option can also display a virtual keyboard for data entry in some embodiments.

Through the setup 57 option a user can see and set user preferences. Examples of user preferences can include how the user desires to visualize information, what information the user would like to see in the different options and/or how the different screens should appear.

Though the options illustrated on the menu bar 44 of FIG. 3 have been discussed, certain embodiments can have other options or can display other information different or similar to that disclosed. Also certain embodiments can have combinations of options including some or all of those discussed and/or some or all options not discussed.

The interface display 40 can also display the operator status 74. The operator status according to certain embodiments can give the on/off status of the unit as well as the speed of the internet connection. In certain embodiments the operator status 74 can be displayed on the title bar 42.

FIG. 3 also illustrates alert 72 displayed on the title bar 42. Alert 72 in certain embodiments can comprise a button for the purpose of security or safety of the boat user. In certain embodiments a user can press the alert 72 button to send an instantaneous message to a predetermined location or locations. This message of one embodiment can include, for example, the real-time location or position of the boat from the GPS data. The message of another embodiment can also include a request for help or assistance. The message can comprise a text message, an email message, a prerecorded message, and/or an automated message. The message can be sent via e-mail, land-line phone, mobile phone, pager, and/or other similar services. The location or locations can be anyone or anywhere a user chooses. Particular examples can include a particular phone or pager number (for a home, a spouse's cell phone, the Coast Guard, the Yacht Club, etc.), an e-mail address, or a radio frequency/channel. The alert 72 of certain embodiments can also inform a user when the message has been received by the predetermined source.

The system 1 can have a multiplicity of uses. The system besides the data and voice capabilities already described can have enough capacity to perform as an information center. In this way the system can also be used for:

a) Tracking or logistical control of a fleet of vessels equipped with it, b) serving as a particularly accurate way for boat builders and parts providers to develop a better knowledge of their users' habits and the way they employ their products, developing a strong Customer Relationship Management, c) allowing a fleet of fishing boats to develop a "net integrated knowledge" of what is going on the fleet's boats, d) establishing an internet interface from and to the boat, using voice and image capacity on a real time basis, providing full duplex communication, e) creating a real time interaction of a Marine or Yacht Club and its customers, f) discovering new ways of improving navigation and better knowing the weather forecast, g) providing an alternative alarm system capable of transmitting possible risks or incidents, h) disclosing new usages onboard vessels, in correspondence with new World Wide Web products and services, i) providing insurance companies with the ability to monitor the actual risk and usage experienced by the boat.

While the described invention is described in terms of specific embodiments, it is implicit that the System is not limited to these disclosed examples. The invention may be embodied in many different varieties and should not be construed as limited to the embodiments set forth herein; rather these embodiments are provided by illustration purposes only. Undeniably, many modifications and other embodiments of the invention will come to mind of those skilled in the art to which the invention pertains, and which are intended to be and are covered by this disclosure, the drawings and the claims. In addition, though the disclosed system is discussed as related to boats, it is not constrained to them as its functioning principles can also be used to perform similar tasks off boats.

What is claimed is:

1. A marine telemetry and two-way communication system comprising:

a central processing unit associated with a boat;

at least one sensor module associated with the boat, wherein the sensor module is configured to measure at least one parameter of the boat and communicate the at least one parameter to the central processing unit;

an interface located on the boat to communicate with the central processing unit, the interface configured to receive information from and to input information to the central processing unit; and a two-way communications unit associated with the boat to communicate to and from the CPU and from the CPU out;

wherein the system is configured to communicate information related to the at least one measured parameter to the interface and to a remote computer, where the information is saved by the remote computer and accessible from a website, the remote computer capable of displaying the information at substantially real-time to the website.

2. The system of claim 1 wherein the at least one sensor module comprises an accelerometer.

3. The system of claim 2 wherein the accelerometer is a three-axis accelerometer.

4. The system of claim 1 wherein the information conveyed by the interface includes the transformation of the measured parameter into a different parameter.

5. The system of claim 4 wherein the different parameter is derived from multiple measured parameters.

6. The system of claim 5 wherein the multiple measured parameters are from different modules.

7. A marine telemetry and two-way communication system comprising:

a central processing unit associated with a boat;

a group of sensor modules associated with the boat, wherein the sensor modules are configured to each measure at least one parameter of the boat and communicate the at least one parameter to the central processing unit, the group of sensor modules comprising:

a position sensor;

an orientation sensor; and an operational sensor; and an interface located on the boat to communicate with the central processing unit, the interface configured to receive information from and to input information to the central processing unit; and wherein the system is configured to communicate information related to the measured parameters to the interface.

8. The system of claim 7 further comprising a two-way communications unit associated with the boat to communicate to and from the CPU and from the CPU out.

9. The system of claim 8 configured to communicate information related to the measured parameters to a remote computer, where the information is saved by the remote computer and accessible from a website, the remote computer capable of displaying the information at substantially real-time to the website.

10. The system of claim 7 wherein the position sensor comprises a Global Positioning System sensor.

11. The system of claim 7 wherein the orientation sensor comprises an accelerometer.

12. The system of claim 7 wherein the operational sensor is selected from a group comprising: an engine sensor, a battery sensor, and a fuel sensor.

13. The system of claim 7 wherein the group of sensor modules further comprises a weather sensor.

* * * * *